Patented Aug. 2, 1932

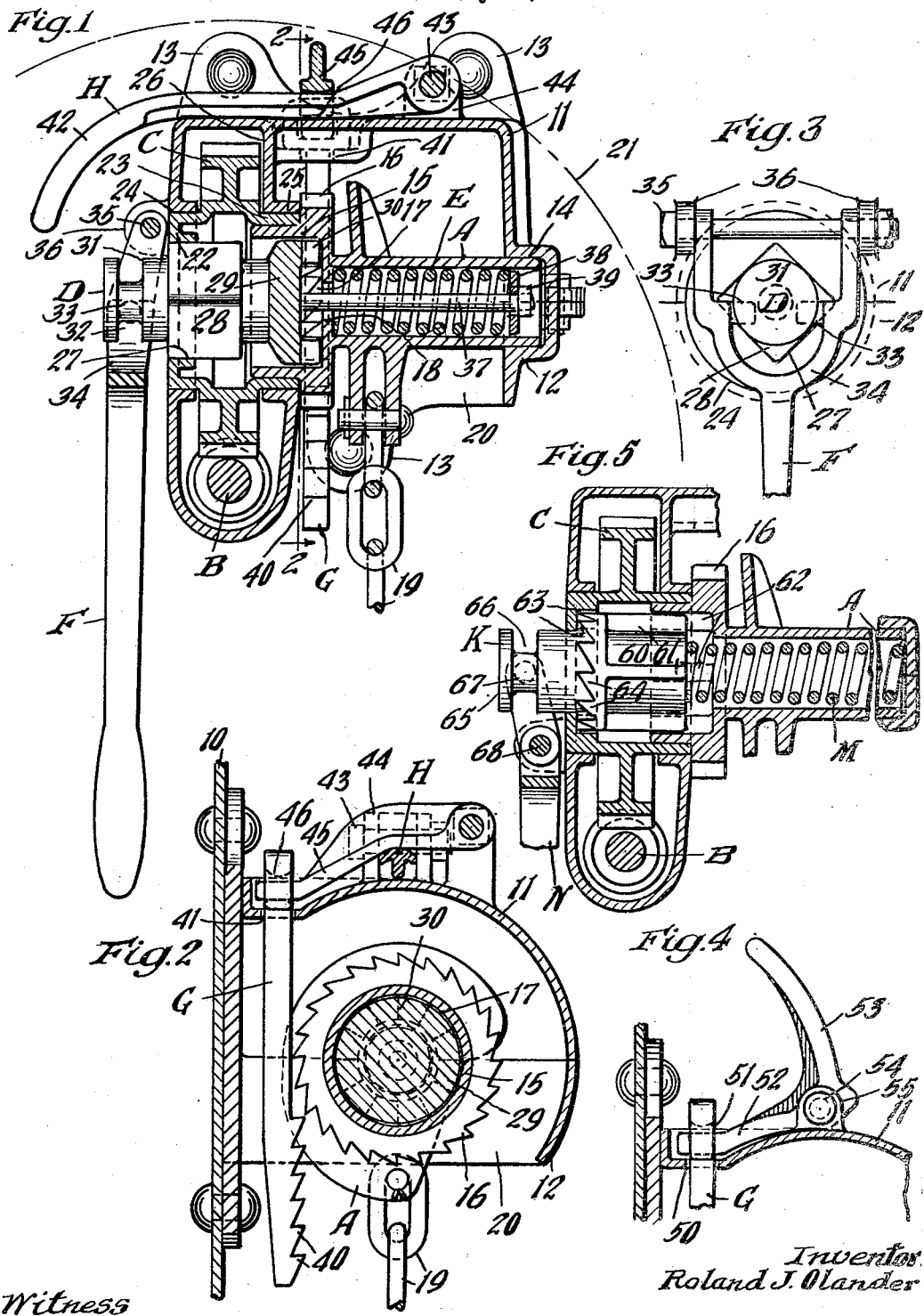

1,869,580

UNITED STATES PATENT OFFICE

ROLAND J. OLANDER, OF CHICAGO, ILLINOIS, ASSIGNOR TO W. H. MINER, INC., OF CHICAGO, ILLINOIS, A CORPORATION OF DELAWARE

HAND BRAKE

Application filed July 24, 1931. Serial No. 552,880.

This invention relates to improvements in hand brakes.

One object of the invention is to provide a hand brake mechanism of the power-multiplying gear actuated type including a chain winding drum, so designed that rapid take-up of the brake chain is had during the first part of the operation, quickly bringing the brake shoes into operative contact with the car wheels.

Another object of the invention is to provide in a mechanism of the character specified in the preceding paragraph, manually operated means which is independent of the power-multiplying gearing for rapidly rotating the chain winding drum of the brake mechanism to quickly take up the slack.

A more specific object of the invention is to provide in a power-multiplying hand brake mechanism, a manually operated pull member geared to the chain winding drum to effect rapid initial rotation of the drum to take up the slack in the mechanism and bring the brake shoes to their operative braking position, wherein the chain winding drum is normally actuated by power-multiplying gearing and ratchet means is employed between said gearing and drum to permit rotation of the drum with respect to said gearing during the time that the drum is actuated by the pull member in taking up the slack.

Other objects of the invention will more fully and clearly appear from the description and claims hereinafter following.

In the drawing, forming a part of this specification, Figure 1 is a vertical sectional view in a plane parallel to the end wall of the car, illustrating my improved brake mechanism as mounted on said end wall. Figure 2 is a vertical sectional view corresponding substantially to the line 2—2 of Figure 1. Figure 3 is a side elevational view looking from the left in Figure 1, and showing the upper section of the actuating lever for the clutch mechanism of my improved brakes, together with adjacent parts of this structure. Figure 4 is a view similar to Figure 2, illustrating a different embodiment of the invention, and showing the upper section of the housing, a pull rod and a modified form of actuating member for the pull rod. And Figure 5 is a view similar to Figure 1, showing still another embodiment of the invention, certain parts of the mechanism being broken away.

Referring first to the embodiment of the invention illustrated in Figures 1, 2 and 3, my improved brake mechanism is shown as enclosed within a housing which is mounted on the end wall of the car, said end wall being indicated by 10. As shown, the housing is of two-part construction comprising an upper section 11 and a lower section 12. The housing is divided horizontally and the meeting portions of the sections 11 and 12 thereof are provided with part bearing members which support the rotary elements of the brake mechanism as hereinafter pointed out. The two sections 11 and 12 of the housing are provided with outstanding ears 13—13, by means of which the housing is fixed to the vertical end wall 10 of the car. Any suitable securing means may be employed for this purpose, and in the present instance rivets are shown.

My improved hand brake mechanism, as shown in Figures 1, 2 and 3, comprises broadly a chain winding drum A; power-multiplying gearing, including a worm B and a worm wheel C; a sliding clutch member D operatively connecting the worm wheel and drum, the clutch member having ratchet teeth thereon cooperating with teeth on the drum; a spring E for normally holding the ratchet means, comprising the cooperating teeth of the clutch and drum, engaged; an actuating lever F for the clutch; a reciprocating bar G for rapidly rotating said drum with respect to the power-multiplying gearing; and actuating means H for moving said bar G.

The chain winding drum A is of hollow design and has the right-hand end portion thereof journaled in a bearing 14 provided in the right-hand end wall of the housing, as viewed in Figure 1. At the opposite end, the drum is provided with an enlarged section 15 presenting a cylindrical outer bearing surface which cooperates with bearing means on the worm wheel C, as hereinafter pointed out. The bearing portion 15 is provided with an annular flange at the inner end thereof, which forms a ratchet wheel 16. The chain winding drum is also provided with interior ratchet teeth 17, which are formed on the shoulder portion provided by the enlarged section 15 of the drum. These ratchet teeth cooperate with the teeth of the clutch member D, as hereinafter pointed out. The portion of the drum which is of smaller diameter houses the spring E, said spring bearing at the left-hand end on an annular interior flange 18 at the enlarged section 15 of the drum, as clearly shown in Figure 1. The drum A has the usual brake chain 19 connected thereto, the chain being wound on the drum during the tightening of the brakes, movement of the chain during this action being accommodated within an opening 20 provided in the bottom wall of the housing section 12.

The worm wheel C, which is rotatable about a horizontal axis in alignment with the axis of rotation of the chain winding drum A, is actuated by means of the worm member B which in turn is operated by the usual hand wheel shown in dotted lines in Figure 1 and indicated by 21. The worm wheel C has the hub section thereof provided with cylindrical bearing portions 22 and 23, which are journaled respectively in bearing openings 24 and 25 provided in the left-hand end wall of the housing, as viewed in Figure 1, and a partition wall 26. The hub section of the worm wheel C is provided with an axial opening which has a portion thereof of square cross section, as indicated at 27, to accommodate a portion 28 of square cross section on the clutch member D for sliding movement. As will be evident, the clutch member D is rotatable with the worm wheel C. The hub section 23 at the right-hand end of the worm wheel C provides interior bearing means for the cylindrical bearing portion of the enlarged section 15 of the drum. At the right-hand end, the sliding clutch member D is provided with a clutch head 29 having ratchet teeth 30 which cooperate with the ratchet teeth 17 of the drum. At the outer end, the clutch member is provided with a reduced projection 31 which has an annular groove 32 therein with which lugs 33—33 on the forked upper end 34 of the operating lever F engage. The section of the lever above the clutch member D is pivoted to the housing by means of a pin 35 extending through lugs 36—36 provided on the housing.

As will be evident, when the lever F is swung upwardly and to the left, as viewed in Figure 1, the clutch D will be slid outwardly in the worm wheel C, thereby disengaging the teeth 30 of the clutch from the teeth 17 of the drum. The spring E yieldingly holds the clutch engaged with the teeth and the drum. The clutch member D is provided with a rod-like stem 37 which extends through the spring E and has a follower disc 38 at the right-hand end thereof bearing on the corresponding end of the spring. The follower disc 38 is held in position on the stem by means of a securing nut 39.

The reciprocating bar G, by means of which the ratchet member 16 is actuated, is in the form of a vertically disposed rack bar having a plurality of ratchet teeth 40—40 thereon which engage with the teeth of the ratchet wheel 16 when the bar is raised, thereby rotating the drum A in chain winding direction. The bar G extends through an opening 41 in the top wall of the housing and has the upper end thereof connected with the actuating means H. The actuating means H comprises an operating lever 42 which has the inner end swingingly mounted by means of a pivot 43 supported in bearing brackets 44—44 at the top of the housing. The intermediate portion of the lever 42 engages underneath a pivoted finger 45 which in turn has the outer end thereof engaged within an opening 46 provided at the upper end of the bar G. As will be evident, raising of the lever 42 effects a similar movement of the finger 45 which in turn causes the bar G to be moved upwardly. During the upward movement of the bar, the ratchet teeth 40—40 thereof engage the ratchet teeth of the member 16, thereby effecting rotation of the drum in chain winding direction. This rotation is permitted by the arrangement of ratchet teeth between the clutch member D and the drum A.

In the operation of my improved hand brake mechanism, as shown in Figures 1, 2 and 3, in tightening the brakes the slack in the brake chain 19 is first taken up by raising the lever 42, thereby actuating the ratchet bar G and rotating the drum A in chain winding direction. This rotation is permitted with respect to the worm wheel C through the ratchet connection of the clutch with the drum, the worm wheel at this time being stationary. As will be evident, rapid raising of the bar G will effect similar rapid rotation of the drum A, thus completely taking the slack out of the chain 19. If the slack in the usual manner by the operation of the bar G is not sufficient, the upward movement thereof may be repeated. As will be evident, due to the ratcheting action of the cooperating teeth on the bar G and the ratchet member 16 of the drum, the bar will idle over the teeth of the ratchet member 16 during downward movement of the bar to the normal position shown in Figure 2. The bar G is returned by the action of gravity and entirely clears the ratchet teeth of the member 16 when in its lowermost position, as shown in Figure 2. After the slack has been thus taken up, the chain winding drum is rotated in the usual manner by the operation of the hand wheel 10 which actuates the worm B and the worm wheel C. The yielding resistance of the spring at this time holds the clutch engaged with the clutch teeth of the drum, thereby causing the drum to be driven from the worm wheel. To effect quick release of the brakes, the actuating lever F is pulled to the left and upwardly, as viewed in Figure 1, thereby completely disengaging the clutch teeth of the member D from the cooperating teeth of the drum. Free rotation of the chain winding drum with respect to the power-multiplying gearing is thus permitted, thereby allowing the chain to completely unwind.

Referring next to the embodiment of the invention illustrated in Figure 4, the construction is substantially the same as that illustrated in Figures 1, 2 and 3, with the exception that a different form of operating means is employed in place of the operating means H for actuating the reciprocating bar G. In Figure 4, the upper section of the housing is indicated by 11 and the reciprocating bar, which is indicated by G, is broken away, illustrating only the upper end thereof. The bar G projects through an opening 50 in the top wall of the section 11 of the housing and has an opening 51 in the projecting end thereof within which engages one arm 52 of a bell-crank lever 53. The lever 53 is pivoted at 54 on a bracket 55. The remaining parts of the brake mechanism of the device illustrated in Figure 4 correspond precisely to the drum A, worm B, worm wheel C, clutch member D, spring E and actuating lever F of the brake mechanism illustrated in Figures 1, 2 and 3. In order to rapidly rotate the chain winding drum, the bar G shown in Figure 4 is pulled upwardly by bell-crank lever 53, the operator pulling on the upstanding hand grip of said bell crank lever.

Referring to the embodiment of the invention illustrated in Figure 5, the same corresponds substantially to the construction shown in Figures 1, 2 and 3, with the exception that the clutch member which operatively connects the worm wheel and drum has the ratchet means thereof cooperating with ratchet means on the worm wheel instead of with ratchet means on the drum, and further in that the arrangement of clutch operating lever and clutch spring is modified. The worm member of the brake mechanism in Figure 5, which is indicated by B, the worm wheel, which is indicated by C, and the chain winding drum A correspond substantially to the similarly designated parts in Figures 1, 2 and 3. The drum A is provided with a ratchet wheel section 16 which cooperates with the vertically reciprocating bar G, as shown in Figure 1. The clutch member, which is indicated by K, has an end section 60 thereof engaging within a cylindrical opening in the enlarged adjacent end of the drum A. The section 60 of the clutch is provided with longitudinally extending radial ribs 61—61 which engage within grooves 62—62 provided in said enlarged section of the drum, thereby connecting the clutch K to the drum for rotation in unison therewith. The clutch member K is projected outwardly of the drum by means of a spring M which bears on the inner end of the section 60 of the clutch. The worm wheel C, shown in Figure 5, has the front section thereof provided with interior ratchet teeth 63 which cooperate with a series of ratchet teeth 64 adjacent to the corresponding end of the clutch member K. The clutch member K also has an outwardly projecting stem 65 which is provided with an annular groove 66 within which trunnions 67 on the clutch operating lever N engage. The lever N is pivoted below the clutch member K, as indicated at 68. It will be evident, when the lever N is swung upwardly and to the left, as viewed in Figure 5, the clutch K will be forced inwardly against the resistance of the spring M, thereby disengaging the ratchet teeth 63 from teeth 64, and permitting free rotation of the drum with respect to the worm wheel C to effect instantaneous release of the brakes. In order to take up the slack at the beginning of the brake applying action, the drum is rotated with respect to the worm wheel C in chain winding direction in a similar manner to that described in connection with Figures 1, 2 and 3, that is, the pull rod G is moved upwardly, thereby rotating the drum A by means of the ratchet 16. During this action, the ratchet teeth of the clutch K will ratchet over the teeth of the worm wheel.

From the preceding description taken in connection with the drawing, it will be seen that I have provided a simple and efficient means for rapidly taking up the slack when applying the brakes, which is especially useful in connection with brake mechanisms wherein power-multiplying gearing is provided to effect tightening of the brakes. As will be appreciated, in brakes employing such power-multiplying gearing, a relatively great number of turns of the hand wheel are necessary in order to take up the slack unless some other means is provided for producing this result. In my improved construction, wherein the mechanism for actuating the chain winding drum to take up the slack co-operates directly with the drum and the drum has ratcheting action with respect to the power-multiplying gearing, a minimum amount of resistance is offered in taking up the slack because the only part rotated is the chain winding drum. This makes the application of the brakes in taking up the slack such that a minimum amount of exertion is required on the part of the brakeman.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding drum; of power-multiplying gear means for rotating the drum; ratchet means operatively connecting the drum and power-multiplying gear means, said ratchet means having ratcheting action to permit rotation of the drum with respect to said power-multiplying gearing in chain winding direction; and manually operated means for rapidly rotating said drum with respect to said gearing in chain winding direction.

2. In a hand brake mechanism, the combination with a rotary chain winding drum; of power-multiplying gear means for rotating the drum; ratchet means operatively connecting the drum and power-multiplying gear means, said ratchet means having ratcheting action to permit rotation of the drum with respect to said power-multiplying gearing in chain winding direction; a reciprocating pull member operatively connected to said drum for rapidly rotating the same with respect to said gearing in chain winding direction; and manually actuated means for operating said pull member.

3. In a hand brake mechanism, the combination with a rotary chain winding drum; of power-multiplying gear means for rotating the drum; ratchet means operatively connecting the drum and power-multiplying gear means, said ratchet means having ratcheting action to permit rotation of the drum with respect to said power-multiplying gearing in chain winding direction; a reciprocating pull rod operatively connected to said drum for rapidly rotating the same with respect to said gearing in chain winding direction; and an operating lever for actuating said pull rod.

4. In a hand brake mechanism, the combination with a rotary chain winding drum; of power-multiplying gear means for rotating the drum; ratchet means operatively connecting the drum and power-multiplying gear means, said ratchet means having ratcheting action to permit rotation of the drum with respect to said power-multiplying gearing in chain winding direction; and a manually operated reciprocating rack bar engaging with means on said chain winding drum for rotating the same relatively to said power-multiplying gearing in chain winding direction.

5. In a hand brake mechanism, the combination with a rotary chain winding drum; of power-multiplying gear means for rotating the drum; ratchet means operatively connecting the drum and power-multiplying gear means, said ratchet means having ratcheting action to permit rotation of the drum with respect to said power-multiplying gearing in chain winding direction; a reciprocating rack bar operatively engaging said chain winding drum for rotating the latter relatively to said power-multiplying gearing in chain winding direction; and an actuating lever for moving said rack bar.

6. In a hand brake mechanism, the combination with a rotary chain winding drum; of power-multiplying gear means for rotating the drum; ratchet means operatively connecting the drum and power-multiplying gear means, said ratchet means having ratcheting action to permit rotation of the drum with respect to said power-multiplying gearing in chain winding direction; a pull bar for rotating said drum relatively to said power-multiplying gearing in chain winding direction, said drum and bar having cooperating ratchet means thereon operatively engaged for rotating the drum in chain winding direction when the bar is moved in one direction, and having ratcheting action with respect to said drum when the bar is moved in a reverse direction.

7. In a hand brake mechanism, the combination with a rotary chain winding drum; of power-multiplying gear means for rotating the drum; ratchet means operatively connecting the drum and power-multiplying gear means, said ratchet means having ratcheting action to permit rotation of the drum with respect to said power-multiplying gearing in chain winding direction; a ratchet wheel fixed to the drum; a reciprocating rack bar having ratchet teeth cooperating with the ratchet wheel; and means for reciprocating said bar.

8. In a hand brake mechanism, the combination with a rotary chain winding drum; of power-multiplying gear means for rotating the drum, including a worm and a worm gear member; ratchet means operatively connecting the drum and power-multiplying gear member, said ratchet means having ratcheting action to permit rotation of the drum with respect to said gear member in chain winding direction; and manually operated means for rapidly rotating said drum with respect to said gear member in chain winding direction.

9. In a hand brake mechanism, the combination with a chain winding drum member; of power-multiplying gears for rotating the drum, including a gear member axially aligned with the drum; a clutch element operatively connecting said gear member and drum, said clutch element having ratcheting means thereon cooperating with ratchet teeth on one of said members and being slidable in the other member but rotatable in unison therewith; yielding means for maintaining the clutch in operative engagement with said member having the teeth; lever means for disengaging said clutch; and manually operated means directly cooperating with the drum for rapidly rotating the same with respect to said gear member in chain winding direction.

10. In a hand brake mechanism, the combination with a chain winding drum, said drum having ratchet teeth thereon; of power-multiplying gears for rotating the drum, including a gear member axially aligned with the drum; of a clutch element slidable in said gear and rotatable in unison therewith, said clutch element having ratchet teeth engaging the ratchet teeth of the drum; spring means for yieldingly holding said clutch element engaged with the teeth of the drum; manually operated means for disengaging said clutch; and manually actuated means for rotating said drum with respect to said gear in chain winding direction.

11. In a hand brake mechanism, the combination with a chain winding drum member; of power-multiplying gearing for actuating said drum, including a worm and a cooperating worm gear member, said worm gear member being axially aligned with the drum; a clutch element operatively connecting said gear member and drum, said clutch element having ratcheting means thereon cooperating with the ratchet teeth on one of said members and being slidable in the other member but rotatable in unison therewith; yielding means for maintaining the clutch in operative engagement with said member having the teeth; lever means for disengaging said clutch; and manually operated means directly cooperating with the drum for rapidly rotating the same with respect to said gear member in chain winding direction.

12. In a hand brake mechanism, the combination with a chain winding drum, said drum having ratchet teeth thereon; of power-multiplying gearing for actuating said drum, including a worm and a cooperating worm gear member axially aligned with said drum; of a clutch element slidable in said gear and rotatable in unison therewith, said clutch element having ratchet teeth engaging the teeth of the drum; spring means for yieldingly holding said clutch engaged with the teeth of the drum; manually operated means for disengaging said clutch; and manually operated means for rotating said drum with respect to said gear in chain winding direction.

13. In a hand brake mechanism, the combination with a chain winding drum; of power-multiplying gears for rotating said drum, including a gear member axially aligned with the drum, said gear member having ratchet clutch teeth thereon; of a clutch element slidable axially in said drum and rotatable in unison therewith, said clutch element having ratchet teeth engaging the teeth of said gear member; spring means for yieldingly holding said clutch engaged with the teeth of the gear member; manually operated means for disengaging said clutch; and manually operated means for rotating said drum with respect to said gear in chain winding direction.

14. In a hand brake mechanism, the combination with a chain winding drum rotatable about a horizontal axis; of a ratchet wheel fixed to the drum; a worm wheel coaxial with said drum; a worm member cooperating with the worm wheel and actuating the same; a sliding ratchet clutch member connecting said worm wheel and drum for rotation in unison upon rotation of said worm wheel in chain winding direction, said ratchet clutch member having ratcheting action to allow rotation of the drum with respect to said worm wheel in chain winding direction; a vertically disposed reciprocating ratchet bar cooperating with the ratchet wheel of the drum to rotate the drum in chain winding direction when said bar is lifted; and means for lifting said bar, said bar being moved downwardly and being returned to the normal position by the action of gravity, and said bar idling over the teeth of the ratchet wheel during said downward movement.

In witness that I claim the foregoing I have hereunto subscribed my name this 22nd day of July, 1931.

ROLAND J. OLANDER.